United States Patent [19]

Murakami et al.

[11] Patent Number: 5,179,683
[45] Date of Patent: Jan. 12, 1993

[54] RETRIEVAL APPARATUS INCLUDING A PLURALITY OF RETRIEVAL UNITS

[75] Inventors: Masaharu Murakami, Odawara; Tamon Masimo, Hiratsuka; Hidefumi Masuzaki, Hadano, all of Japan

[73] Assignee: Hitachi, Ltd., Tokyo, Japan

[21] Appl. No.: 365,490

[22] Filed: Jun. 13, 1989

[30] Foreign Application Priority Data

Jun. 14, 1988 [JP] Japan .................. 63-146469

[51] Int. Cl.$^5$ ................ G06F 9/26; G06F 9/24; G06F 13/14; G06F 13/36
[52] U.S. Cl. ................ 395/425; 364/238.3; 364/238.6; 364/239; 364/240; 364/240.5; 364/242.3; 364/242.31; 364/242.34; 364/242.32; 364/242.91; 364/243; 364/243.2; 364/246.3; 364/246.5; 364/DIG. 1; 364/DIG. 2
[58] Field of Search ... 364/200 MS File, 900 MS FIle; 395/800, 425, 600, 725, 400, 650, 325

[56] References Cited

U.S. PATENT DOCUMENTS

| | | | |
|---|---|---|---|
| 4,276,594 | 6/1981 | Morley | 364/200 |
| 4,484,275 | 11/1984 | Katzman et al. | 364/200 |
| 4,486,827 | 12/1984 | Shima et al. | 364/200 |
| 4,754,326 | 6/1988 | Kram et al. | 364/200 |
| 4,760,526 | 7/1988 | Takeda et al. | 395/600 |
| 4,768,144 | 8/1988 | Winter et al. | 364/200 |

FOREIGN PATENT DOCUMENTS

60-105040  6/1985  Japan .

*Primary Examiner*—Thomas C. Lee
*Assistant Examiner*—Daniel H. Pan
*Attorney, Agent, or Firm*—Fay, Sharpe, Beall, Fagan, Minnich & McKee

[57] ABSTRACT

An apparatus having a storage device for storing information, a CPU for controlling the information and the overall apparatus, and a data bus connecting these constituent elements, there are disposed a plurality of retrieval devices for retrieving information so as to effect concurrent retrieval processing. The retrieval device includes a circuit to conduct a hardware retrieval, a processing unit to achieve a software retrieval, and a data bus connecting these components. The retrieval data is subdivided into partitions by the CPU so as to be subjected to parallel processing in the respective retrieval devices in a distributed fashion.

11 Claims, 6 Drawing Sheets

RETRIEVAL APPARATUS INCLUDING A PLURALITY OF RETRIEVAL UNITS

BACKGROUND OF THE INVENTION

The present invention relates to an information retrieval apparatus for retrieving objective data from a great amount of data stored in a storage such as an optical disk storage or a magnetic disk storage, and in particular, to an information retrieval apparatus in which data to be subjected to the retrieval is subdivided into partitions such that the partitions are independently and concurrently retrieved by use of a plurality of retrieval means.

In the conventional information retrieval apparatus, as described for example in the JP-A-60-105040, there is employed a retrieval circuit for a data retrieval. In consequence, as a method to increase the retrieval processing speed in the conventional information retrieval apparatus, it is essential for the retrieval circuit to develop a higher retrieval speed.

However, since the retrieval circuit is the retrieval means including a hardware system to conduct the retrieval through a data matching operation, even when the processing capacity of the hardware is improved, if the data to be processed is increased, the number of data matching circuits becomes to be greater, which leads to a problem that the retrieval time is elongated in proportion to an increment in the data to be subjected to the retrieval processing.

SUMMARY OF THE INVENTION

It is an object of the present invention to provide an information retrieval apparatus capable of achieving a high-speed retrieval processing even when the amount of the data to undergo the retrieval processing is increased, thereby solving the problem of the prior art technology.

A second object of the present invention is to provide an information retrieval apparatus capable of increasing or decreasing the number of retrieval circuits depending on the amount of the data to undergo the retrieval processing.

A third object of the present invention is to provide an information retrieval apparatus in which data to be subjected to the retrieval is subdivided into partitions such that the partitions are independently and concurrently retrieved by use of a plurality of retrieval circuits.

In general, an information retrieval apparatus includes a central processing unit (CPU), an image input device such as an image scanner, an image output device such as a laser beam printer, an image display device such as a cathode-ray tube (CRT), and an information storage device such as an optical disk storage or a magnetic disk storage, and the CPU is connected to the respective constituent devices by means of a data bus. The data bus is provided with retrieval circuit to retrieve data stored in the information storage device and a memory to temporarily store therein the data to be subjected to the retrieval.

In the information retrieval apparatus according to the present invention, there are included at least an extended bus which is independent of the data bus above and a retrieval circuit which is disposed on the extended bus. The retrieval circuit conducts retrieval processing by use of hardware, for example, a finite store automation system.

In addition, on the extended bus, there are arranged a memory to store therein the data to be subjected to the retrieval and matching data satisfying a retrieval condition and a processing unit to control the retrieval circuit and to control data input/output operations onto the memory.

The extended bus is independent of the data bus and is provided with an interface, which is connected via a bus adapter to the data bus. The bus adapter is employed to connect the data bus to the extended bus and is connected via interfaces to a plurality of extended buses. In addition, the bus adapter treats address spaces on the memories of the plural extended buses as a consecutive address space so as to assign a portion (a window space) of the address space on the data bus to a portion of the address space of the extended bus. This enables the CPU to read data from the extended bus by accessing the memory on the data bus. The bus adapter has a bank register to keep therein a number of an extended bus specified by the CPU and an address of the memory on the extended bus. The address of the memory on the extended bus to be accessed is specified by the CPU for the bus adapter.

When a retrieval is started in the information retrieval apparatus, the CPU loads the data to be subjected to the retrieval from the information storage device via the bus adapter into the memory of each extended bus. The retrieval data includes, for example, index information assigned to each image data stored in the optical disk storage. In this operation, the CPU subdivides the retrieval data into partitions to be loaded in the memory window space of the memory on the data bus.

Next, the CPU effects a retrieval initiation on the memory of each extended bus. The processing unit to which the retrieval initiation is thus conducted supplies the retrieval circuit with a retrieval data store address in the memory of the extended bus such that each retrieval circuit executes the retrieval processing. The retrieval processing is independently and concurrently achieved, and hence a great amount of data can be retrieved at a very high speed by use of a plurality of retrieval circuits. Furthermore, the upper-level CPU is relieved from the execution of the retrieval processing and hence can achieve processing other than the retrieval processing.

When the retrieval processing is completed, the retrieval circuit stores the retrieval result in the memory of the extended bus and then a completion report is issued to the processing unit. On receiving the completion report, the processing unit sends a store address of the retrieval result and the completion report to the CPU. When the completion report is received, the CPU supplies the bus adapter with a number of the extended bus associated with the completion report and the address at which the retrieval result is stored in the memory. As a result, a memory window of the memory on the data bus is assigned to a space on the extended bus where the retrieval result is stored. The CPU accesses the memory on the data bus so as to read the result of the retrieval processing executed on each extended bus and then proceeds to the next processing.

Incidentally, in the information retrieval apparatus according to the present invention, the processing unit on each extended bus may execute, in addition to the control of the extended bus, a retrieval which cannot be achieved by the hardware and a retrieval such as a binary search which is more advantageously conducted by means of the software.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Referring now to the drawings, description will be given of an embodiment according to the present invention.

Figure 1:
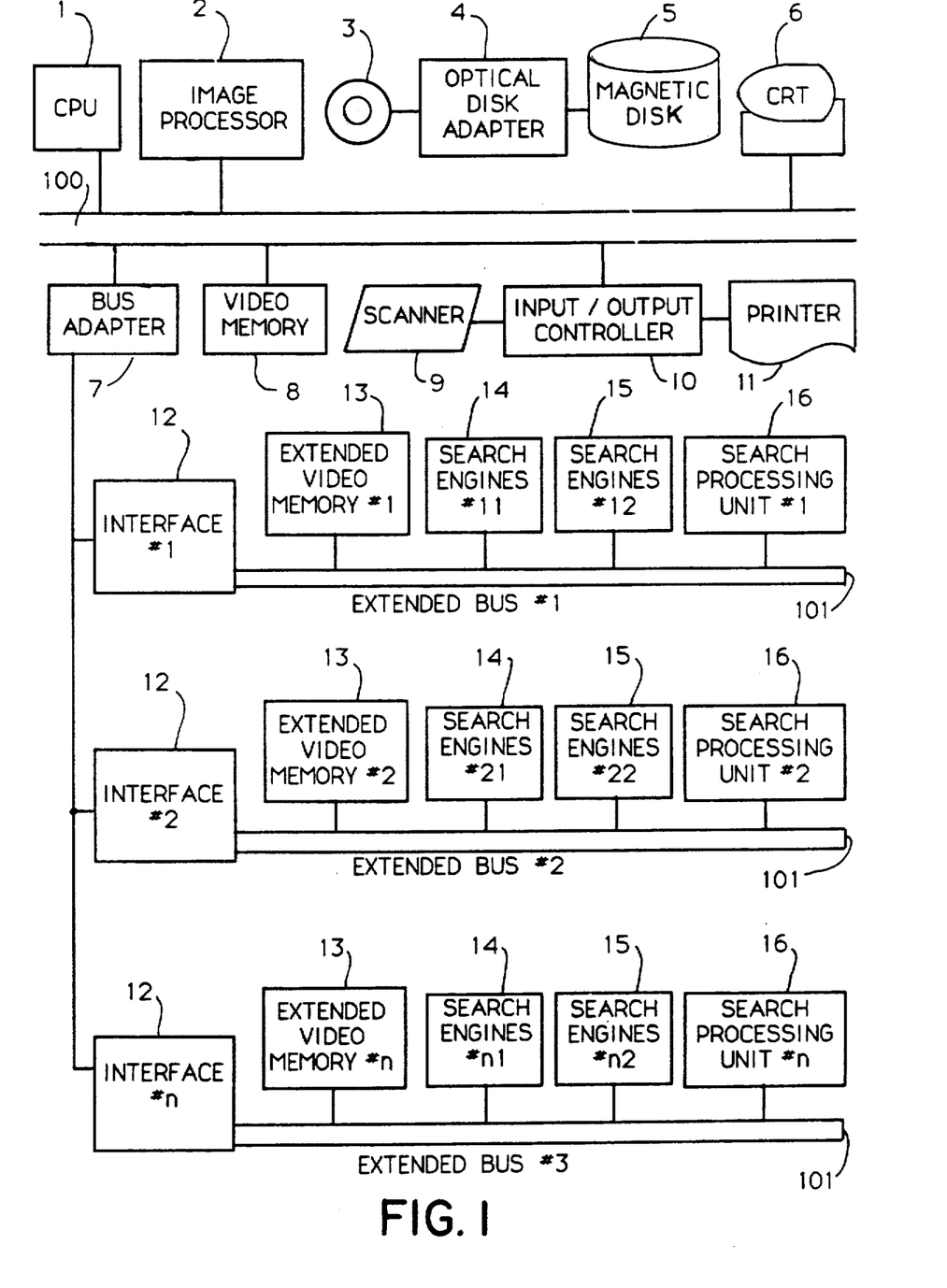
FIG. 1 is a constitution block diagram schematically showing an information retrieval apparatus of an embodiment according to the present invention.

FIG. 1 is a block diagram showing a configuration of an information retrieval apparatus as an embodiment according to the present invention. This system includes a central processing unit 1 for effecting the overall control of the entire information retrieval apparatus according to the present invention, an image processor 2 for conducting compression or expansion of image data produced from a scanner 9 in a form of binary data, an optical disk storage device 3 for recording and for reproducing image data and character data on an optical disk recording medium, and a magnetic disk recording device 5 for achieving recording and playback operations of character data on a magnetic disk recording medium. In general, since the recording medium is replaceable in the optical disk storage device 3 and has quite a large storage capacity, the optical disk storage device 3 is employed for recording image data; whereas the magnetic disk recording device 5 is utilized to store microprograms to be executed by the CPU 1 and various control data items. The configuration further includes an optical disk adapter (ODA) 4 for connecting the optical disk storage device 3 and the magnetic disk recording device 5 to a data bus 100, a cathode-ray tube (CRT) 6 as a display device for visually displaying the image data and document data, and a bus adapter (BUSA) 7 for connecting the data bus 100 to an extended bus 101; more specifically, a plurality of extended buses 101 are connected via an interface (I/F) 12.

Figure 2:
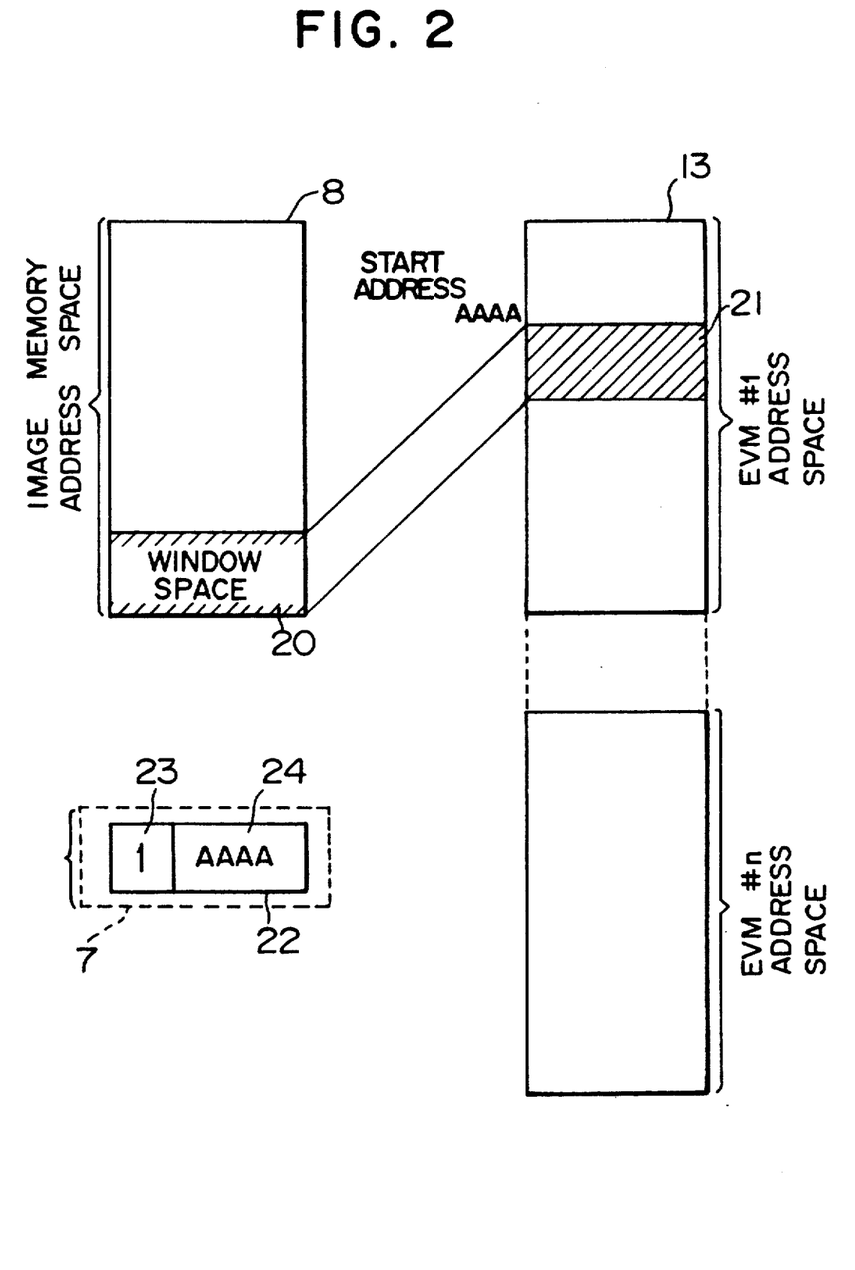
FIG. 2 is a schematic diagram useful to explain operations of the bus adapter.

When the bus adapter 7 effects an access to an address space in a video memory (VM) 8, an address space in an extended video memory (EVM) 13 can be accessed, which will be described with reference to FIG. 2. The address space of the extended bus 101 is handled as n consecutive address space partitions. In a portion of the address space of the video memory 8, there is established a window space 20, which corresponds to an address space 21 of the extended video memory 13 according to a bank switch system. For the specification of the address space 21, the CPU 1 supplies a start address of the extended video memory 13 to the bus adapter 7. The bus adapter 7 includes therein a bank register 22 to store an area number 23 specifying a number of an extended bus 101 and an address number 24 loaded with a start address of the extended video memory 13. In the example of FIG. 2, it is indicated that an address $(AAAA)_H$ of the extended video memory 13 on a first extended bus is assigned to the window space 20 of the video memory 8. Namely, the bus adapter 7 recognizes the address of the extended video memory 13 in this fashion, which enables the constitution of the hardware to be expanded in a unit of the extended bus 101. The CPU 1 recognizes the number of the extended buses 101 connected thereto by checking the content of the extended video memory 13 when the apparatus is initiated. Namely, the CPU 1 can read the content of the extended video memory 13 by accessing the window space 20 of the video memory 8.

The video memory 8 is disposed to temporarily store a video signal read via the scanner 9 and is used as a work area for the CPU 1 and the image processor 2. The scanner 9 is an input device which optically reads image information described on a form or slip so as to produce a binary signal. The system also includes a printer 11, for example, a laser beam printer, which is an output device for printing on a sheet of paper video data stored in the optical disk storage device 3. There is disposed an input/output controller (IOC) 10 for controller input/output operations of video or image data associated with the scanner 9 and the printer 11. The data bus 100 is dedicated to data processing to transfer data to be processed by the CPU 1 and to send instruction codes to be executed by the CPU 1 and in consequence is employed to connect the CPU 1 to the respective storage devices and input/output devices.

In FIG. 1, a portion enclosed with dotted lines indicate retrieval means for executing retrieval operation to attain information stored in the optical disk storage device 3 and the magnetic disk storage device 5. The retrieval means is connected to at least an extended bus 101 via the interface 12. The extended buses 101 are independent of each other such that each extended bus 101 is connected to the extended video memory 13, search engines (SEs) 14 and 15, and a search processing unit (SPU) 16.

The extended video memory 13 is the memory which is disposed to temporarily store therein retrieval data and data retrieved and which is also used as a work area for the search processing unit 16. As described above, by arranging the extended video memory 13 on each extended bus 101, it is possible to independently conduct the retrieval in the respective extended buses 101. The search engines (SEs) 14 and 15 are circuits each for effecting a hardwarewise retrieval on the retrieval data stored in the extended video memory 13. Each extended bus 101 is provided with two search engines 14 and 15 to increase the retrieval processing speed. However, there are not provided three or more search engines because even if the number of the system engines are simply increased, the retrieval processing speed cannot be increased due to a restriction of the transfer capacity of the extended bus 101.

The search processing unit (SPU) 16 controls the data communication in the extended bus 101 and to conduct the retrieval processing by means of software. Since the SPU 16 is disposed for each extended bus 101, the retrieval processing of the respective extended buses 101 are independently and concurrently effected.

Figure 3:
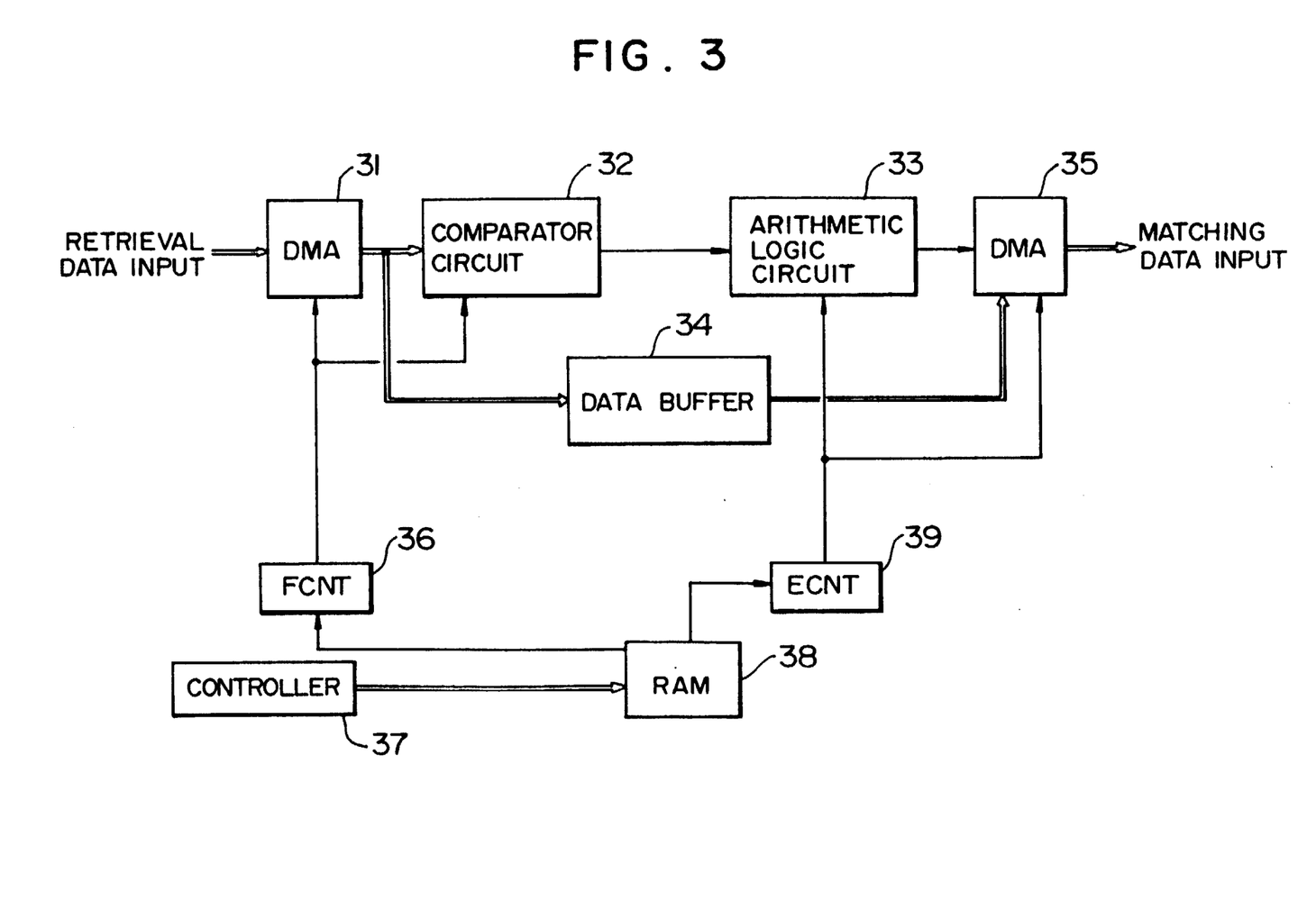
FIG. 3 is a configuration block diagram showing the search engine (SE) 14 or 15 of FIG. 1.

Referring next to FIG. 3, description will be given of an internal configuration of the search engines 14 and 15.

The configuration includes a controller 37 for controlling the internal operations of the system engines 14 and 15, a direct memory access (DMA) unit 31 as a hardware device for reading the retrieval data stored in the extended video memory 13 so as to supply the data to the search engines 14 and 15, and a comparator circuit 32 achieving a comparison of character codes by use of a hardware system, for example, a known finite store automation circuit such that the comparison is conducted for each field as a data retrieval unit.

The system further includes an arithmetic logic circuit 33 for achieving operations such as a logical sum (OR) and a logical product (AND) on an output result from the comparator circuit 32 such that the operations are carried out for each field as a data retrieval unit and to produce an operation result for each entry as a unit associated with the respective fields.

There are also included a data buffer 34 for temporarily storing the retrieval data outputted from the DMA 31, a DMA 35 as a hardware unit which obtains matching retrieval data from the data buffer 34 depending on an output indicating that the retrieval data is judged to satisfy a retrieval condition by the arithmetic logic circuit 33.

The configuration further comprises a random access memory (RAM) 38 for storing therein various data items including control information, a field count, and an entry count. These data items are controlled by the CPU 1 and are beforehand transferred via the bus adapter 7 to the RAM 38. The internal constitution of the retrieval data can be recognized from the contents of the data items.

The system also includes a field length counter (FCNT) 36 for identifying a length of a field as a data compare unit so as to supply the DMA 31 and the comparator circuit 32 with the obtained field length and an entry length counter (ECNT) 39 for recognizing a length of an entry as a specified unit of the respective fields so as to send the length to the arithmetic logic circuit 33 and a DMA 35.

Next, description will be given of the search engines (SEs) 14 and 15. First, the retrieval data is fetched from the DMA 31. Incidentally, the compare operation of the retrieval data is conducted for each field as a retrieval unit such that data of each field is judged to determine whether or not data thereof satisfies a retrieval condition. The comparator circuit 32 outputs an output for each field indicating whether the matching results in (OK) or not (NG). Next, the arithmetic logic circuit 33 achieves a logical operation on data for which OK is issued in each field so as to produce an output for each entry unit indicating whether the matching results in (OK) or not (NG). The DMA 35 reads from the data buffer 34 the retrieval data associated with OK and then delivers the data as matching data to the extended video memory 13.

Next, description will be given of the overall operation of the information retrieval apparatus of the embodiment according to the present invention.

The CPU 1 reads the retrieval data stored in the optical disk storage device 3 and the magnetic disk storage device 5 and then activates the optical disk adapter 4 to transfer the data to the respective extended video memories 13. In this operation, the CPU 1 subdivides the retrieval data into partitions to be transferred to the extended video memories 13. As a method of subdividing the retrieval data, the retrieval data may be simply subdivided according to the number of extended video memories 13 or depending on kinds of retrieval data, for example, the character type, numeric type, or image data type. In addition, in a case where the CPU 1 accomplishes retrieval processing for a plurality of users in a multitask system, the retrieval data may be subdivided according to the users, which leads to an advantage that the multitask control is facilitated in the CPU 1. The retrieval data is written via the bus adapter 7 into the extended video memory 13 of each extended bus 101.

Figure 4:
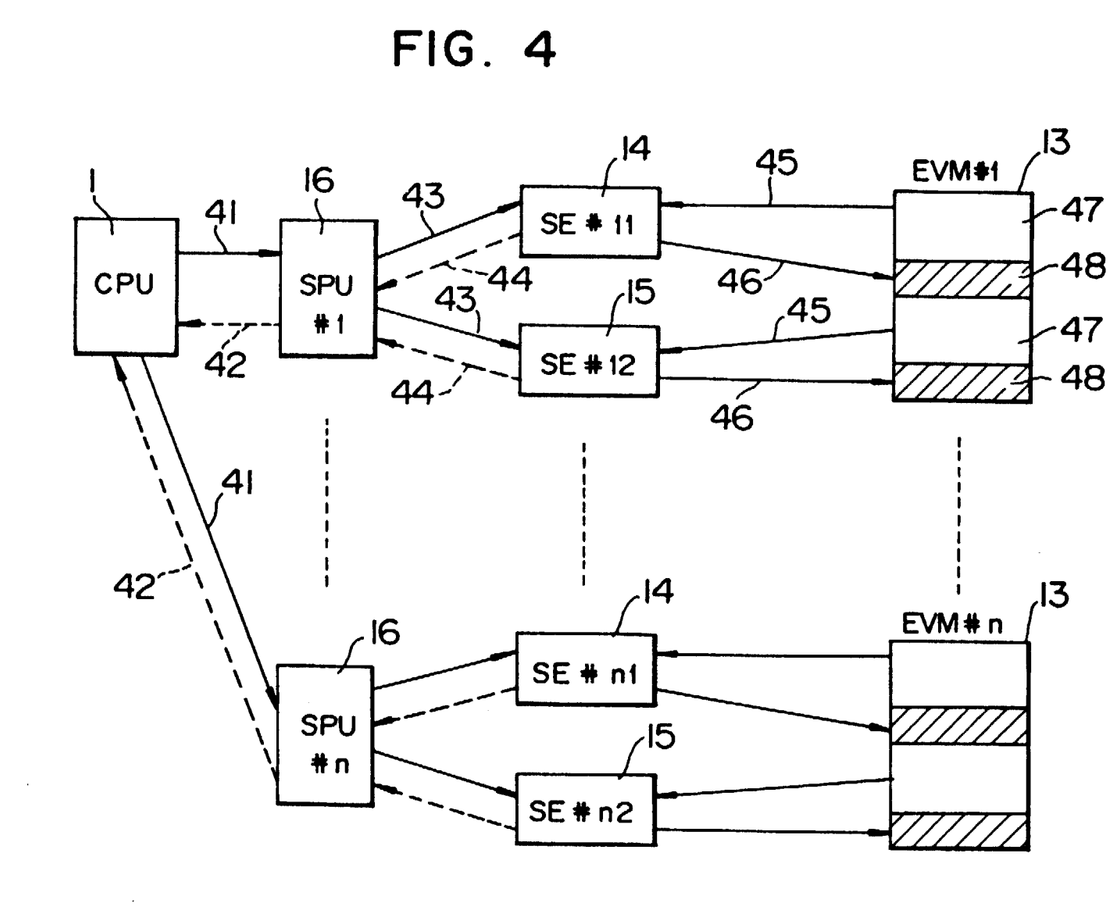
FIG. 4 is a schematic diagram showing flows of signals and data when retrieval processing is executed.

When the partitioned retrieval data is transferred to each extended video memory 13, the CPU 1 then passes parameters necessary for the retrieval to the respective search processing units 16 together with a retrieval initiate signal 41. The parameters necessary for the retrieval includes, for example, the number of fields, the number of entries, and information about the data structure of the retrieval data.

On receiving the retrieval initiate signal 41, the SPU 16 sets the parameters to the search engines 14 and 15 and sends an address of the extended video memory 13 where the retrieval data is stored thereto and then issues a retrieval initiate instruction signal 43. The search engines 14 and 15 read assigned retrieval data 45 from a retrieval data area 47 of the extended video memory 13, thereby executing the retrieval processing. The search engines 14 and 15 write matching data 46 in a matching data area 48 of the extended video memory 13. When the retrieval is completed, the search engines 14 and 15 send a completion report signal 44 to the SPU 16. After the retrieval processing of the search engines 14 and 15 is finished, the SPU 16 transmits a completion report signal 42 to the CPU 1. On receiving the completion report signal 42, the CPU 1 reads the matching data from the matching data area 35 of each extended video memory 13, thereby completing the retrieval processing.

Incidentally, the retrieval processing above is independently and concurrently executed in the respective extended buses 101.

Figure 5:
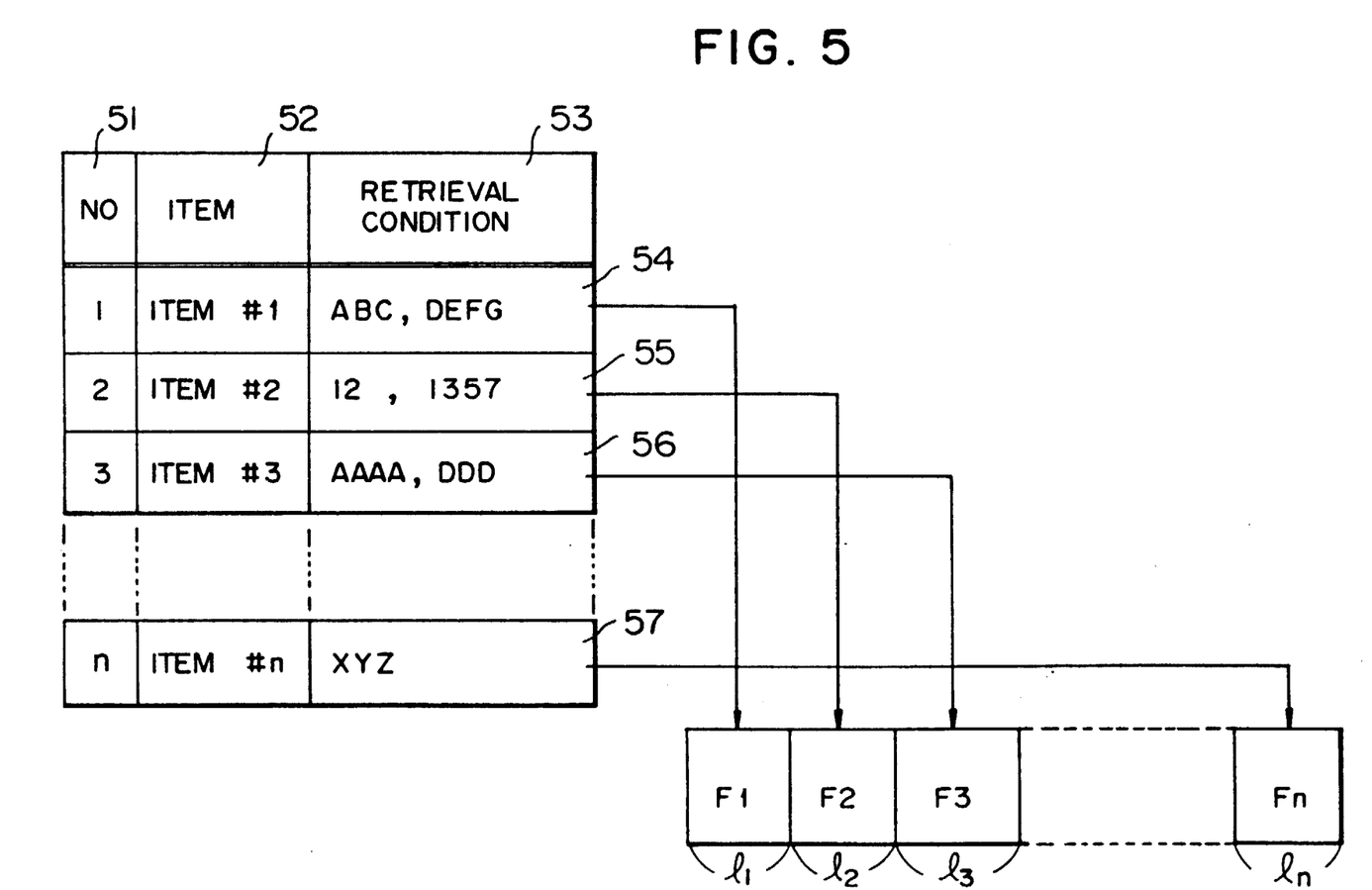
FIG. 5 is a diagram schematically showing data formats employed to represent retrieval conditions.

Referring next to FIG. 5, description will be given of the data format of the retrieval expression. In general, data stored in the optical disk storage device 3 includes title information as index information of the respective data. As indicated in the field of item 52, there are disposed n title information items ranging from item #1 to item #n. For example, the item #1 and item #2 are associated with a title and a control code, respectively. When a retrieval expression is executed depending on these index information items, a retrieval condition 53 is set for each item. In the example of FIG. 5, for example, there are specified that a retrieval condition 54 of the item #1 is ABC or DEFG and that a retrieval condition 55 of the item #2 is 12 or 1357. The unit of the length of each of the retrieval conditions 54 to 57 of the item 52 is called a field, and a group of these retrieval conditions is called an entry. That is, as indicated in the lower-right portion of FIG. 5, the retrieval conditions 54 to 57 of the respective items are fields F1 to Fn, respectively and the lengths thereof are $l_1$ to $l_n$; whereas the group including the fields F1 to Fn is called an entry and the length thereof is represented as $l_1 + l_2 + \ldots, l_n$.

In the embodiment described above, each extended bus 101 is independent of the data bus 100; in consequence, while the respective search engines 14 and 15 are executing the retrieval processing, the CPU 1 can execute other processing such as an image data transfer; moreover, the retrieval processing, when viewed from the CPU 1, can be processed as a command.

In addition, by disposing many extended buses 101 according to the amount of the retrieval data, it is possible to prevent an increase in the retrieval processing time.

Figure 6:
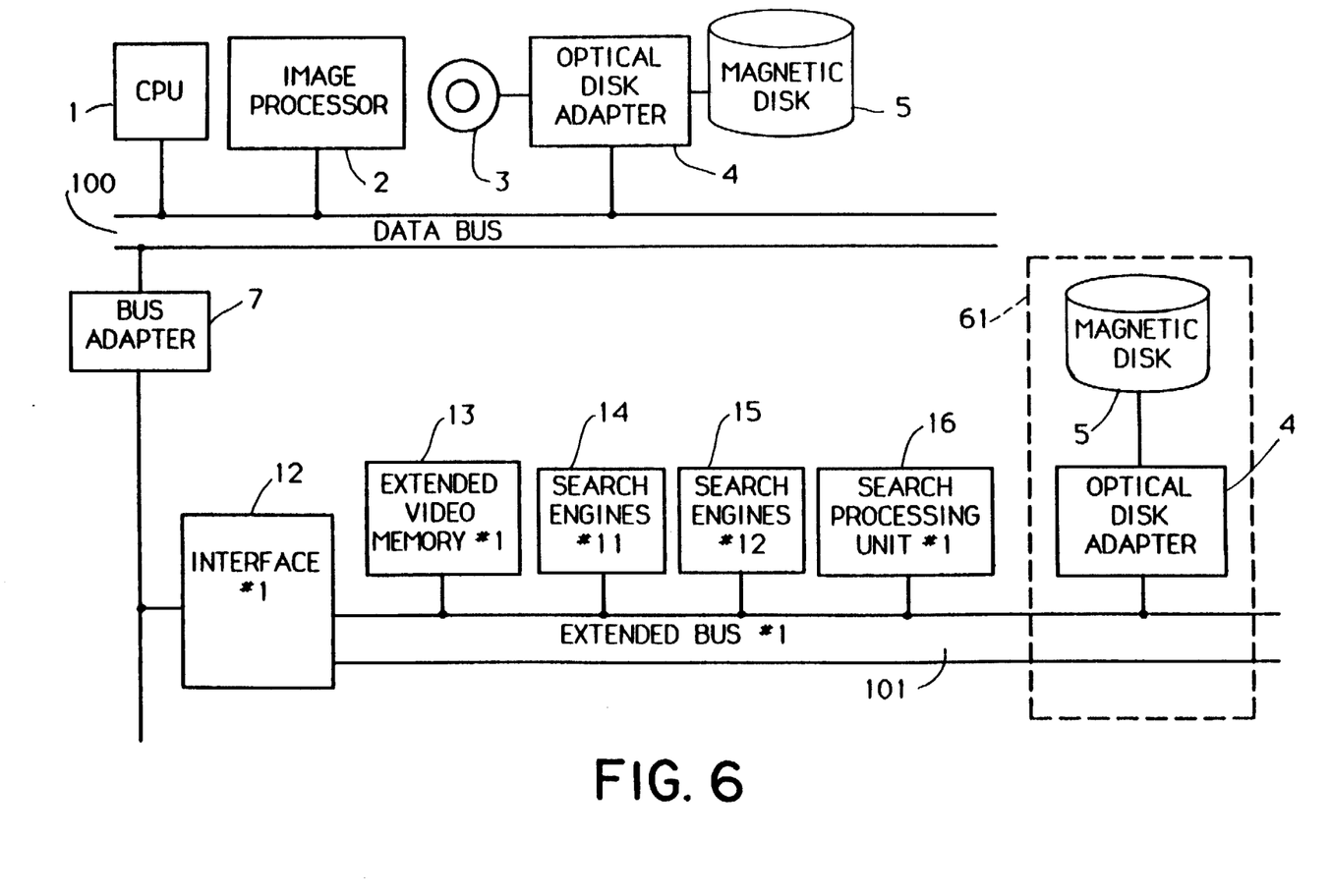
FIG. 6 is a constitution block diagram schematically showing an information retrieval apparatus of an alternative embodiment according to the present invention.

FIG. 6 is a block diagram showing the configuration of an information retrieval apparatus as an alternative embodiment according to the present invention. In this example, when handling a great amount of data, it takes a considerable period of time for the CPU 1 to load the retrieval data into the respective extended video memories 13; consequently, there are disposed storage means 61, namely, there are distributed the optical disk storage device 3 or the magnetic disk storage device 5 on the respective extended buses 101. With this provision, the retrieval data is subdivided for the respective extended buses 101 so as to be efficiently controlled, thereby increasing the retrieval processing speed.

While particular embodiments of the invention have been shown and described, it will be obvious to those skilled in the art that various changes and modifications may be made without departing from the present invention in its broader aspects.

We claim:

1. An information retrieval apparatus comprising:
   storage means for storing therein data to be retrieved;
   a central processing unit (CPU) for subdividing the data stored in said storage means according to a predetermined unit, for transferring the data to be retrieved and for controlling a start and an end of retrieval processing;
   a first memory for use as a work area for the CPU;
   a first data bus connecting the CPU, the storage means and the first memory;
   retrieval means provided independently of the first bus, said retrieval means including a second memory for temporarily storing the data to be retrieved, a retrieval unit for retrieving the retrieval data stored in the second memory, a processing unit for controlling start and end of retrieval of the retrieval unit, and a second bus connecting the second memory, the retrieval unit and the processing unit, said retrieval means retrieving the retrieval data stored in the second memory and temporarily storing its retrieval result in the second memory; and
   an adapter,
   to selectively connect the first and second buses, and having an address memory to identify a start address in said second memory, so that an address space of the second memory, specified by the CPU, can be allocated to a specific address space of the first memory to thereby permit the cup to store in the second memory the data transferred from the storage means using the specific address space of the first memory, and the CPU can read a content of the second memory by accessing the address space of the first memory, the data in the specific address space divided in predetermined units by the CPU,
   and, to allocate the retrieval result stored in the second memory to the specific address space of the first memory.

2. An information retrieval apparatus according to claim 1, wherein said adapter includes assigning means to assign an arbitrary address space of said second memory to a particular address space of said first memory.

3. An information retrieval apparatus according to claim 2, wherein said adapter includes a register for storing therein a number identifying either one of said second data bus and an address of the assigned second memory.

4. An information retrieval apparatus according to claim 1, wherein said second memory is used to store therein the retrieval data and data for which a matching results as a result of the retrieval.

5. An information retrieval apparatus according to claim 1, wherein said retrieval means include a hardware component.

6. An information retrieval apparatus according to claim 1, wherein the CPU monopolizes said first bus until the CPU is connected to said second bus.

7. An information retrieval apparatus comprising:
   storage means for storing therein retrieval data;
   a CPU for controlling a transfer of the retrieval data and an initiation and a termination of retrieval processing;
   a first data bus for connecting said CPU to said storage means for achieving a communication of information therebetween;
   a first memory for storing therein retrieval data which matches with a retrieval condition in a retrieval processing;
   a plurality of retrieval means each capable of acting independently of and concurrently with each other and the CPU, for judging to determine which one of the retrieval data specified by the CPU matches with a predetermined retrieval condition each of said retrieval means including,
      a second memory for temporarily storing information therein,
      a discriminator circuit for judging to determine whether or not the retrieval data stored in said second memory matches with a predetermined retrieval condition,
      a processing unit to start and end retrieval processing; and,
      an extended bus for providing an information communication path between the second memory, the discriminator circuit, and the processing unit; and
   an adapter for providing a data communication path between said first data bus and one of said retrieval means so as to selectively connect one of said retrieval means to said first data bus, and said adapter operating to selectively connect the first bus and an extended bus, and having an address memory to identify a start address in one of the second memories, so that an address space of the second memory, specified by the CPU, can be allocated to a specific address space of the first memory to thereby permit the CPU to store in said second memory the data transferred from the storage means using a specific address space of the first memory, and the CPU can read a content of said second memory by accessing the address space of the first memory.

8. An information retrieval apparatus according to claim 7, wherein said CPU subdivides the retrieval data into partitions and transfers the partitioned retrieval data to said retrieval means.

9. An information retrieval apparatus according to claim 8, wherein said CPU controls a plurality of different retrieval processing in a multitask system so as to subdivide the retrieval data into partitions for respective tasks and to transfer the partitioned retrieval data to said retrieval means.

10. An information retrieval apparatus according to claim 7, wherein said adapter is directly connectable to a plurality of retrieval means.

11. An information retrieval method in an information retrieval apparatus including a first bus and second bus means selectively connected by an adapter means, said first bus connected to a storage means for storing therein retrieval data, a CPU for controlling an initiation and a termination of retrieval processing and a transfer of the retrieval data, a first memory for storing therein the retrieval data, second bus means connected to second memory means and a plurality of retrieval means for judging to determine which one of the retrieval data matches with a preset retrieval condition for the particular retrieval means, said method comprising the steps of:

(a) allocating, by means of the adapter, an address space of the second memory means, specified by the CPU, to a specific address space of the first memory said adapter selectively connecting the first bus and second bus means and having an address memory to identify a start address in said second memory means, so that an address space of the second memory means, specified by the CPU, can be allocated to a specific address space of the first memory, and the CPU can read a content of the second memory means by accessing the address space of the first memory, transferring data retrieved from the storage means and divided on a predetermined unit basis by the CPU, to the specific address space of the first memory and storing the retrieval data, as divided, into the second memory;

(b) retrieving the retrieval data stored in the second memory means independently and concurrently by use of a selected one of the retrieval means and storing its retrieval results in the respective second memory means; and, (c) allocating, by means of the adapter, the retrieval results stored in the second memory means to the specific address space of the first memory and accessing the specific address space of the first memory by means of the CPU to read the retrieval results stored in the second memory means.

* * * * *